US006643959B2

(12) United States Patent
Jolliff et al.

(10) Patent No.: US 6,643,959 B2
(45) Date of Patent: Nov. 11, 2003

(54) IMPLEMENT HAVING ENGINE AND TRANSAXLE MODULE

(75) Inventors: Norman E. Jolliff, Salem, IN (US); Vance E. Coble, Campbellsburg, IN (US); Richard T. Ruebusch, New Albany, IN (US)

(73) Assignee: Tecumseh Products Company, Tecumseh, MI (US)

( * ) Notice: Subject to any disclaimer, the term of this patent is extended or adjusted under 35 U.S.C. 154(b) by 80 days.

(21) Appl. No.: 09/785,431

(22) Filed: Feb. 16, 2001

(65) Prior Publication Data

US 2001/0032447 A1 Oct. 25, 2001

Related U.S. Application Data

(60) Provisional application No. 60/184,243, filed on Feb. 23, 2000, and provisional application No. 60/184,477, filed on Feb. 23, 2000.

(51) Int. Cl.[7] .............................. E01H 5/09; A01B 33/02
(52) U.S. Cl. .............................. 37/244; 172/42; 172/133
(58) Field of Search .............................. 172/41–43, 60, 172/112, 125, 253, 133; 180/6.2, 6.24; 37/244, 247, 241; 56/10.5, 11.3

(56) References Cited

U.S. PATENT DOCUMENTS

| 2,695,071 A | 11/1954 | Hupp | 180/19 |
|---|---|---|---|
| 2,975,839 A | 3/1961 | Burrows et al. | 172/125 |
| 3,603,162 A | * 9/1971 | Gohler | 172/42 |
| 4,924,961 A | 5/1990 | Bernardi | 180/374 |
| 5,520,253 A | 5/1996 | Kesting | 172/125 |
| 5,896,931 A | * 4/1999 | Roberts et al. | 172/42 |

OTHER PUBLICATIONS

BCS brochure entitled "The World's Leader in Gardening Equipment"(1996).

* cited by examiner

Primary Examiner—Robert E. Pezzuto
(74) Attorney, Agent, or Firm—Baker & Daniels

(57) ABSTRACT

An implement having an engine and a transaxle which may be rigidly and directly attached to one another in a vertically stacked orientation to form an engine and transaxle module. The implement also includes ground engaging wheels attached to the transaxle axles, a handle allowing control of the implement, and one of a plurality of interchangeable working devices attached to the engine and transaxle module. For example, the implement may be a snow thrower having an auger assembly which is operatively coupled to one of the engine and the transaxle. The transaxle may include a pair of axially aligned axles which are selectively coupled together, such that when the axles are coupled together, the wheels are rotatably fixed together, and when the axles are not coupled together, the wheels are free to rotate relative to each other. The transaxle may further include a pair of housing portions, at least one housing portion having a pair of recesses in which a pair of bushings are respectively disposed, each bushing supporting an end of each of a pair of shafts of the reduction gearing of the transaxle.

17 Claims, 18 Drawing Sheets

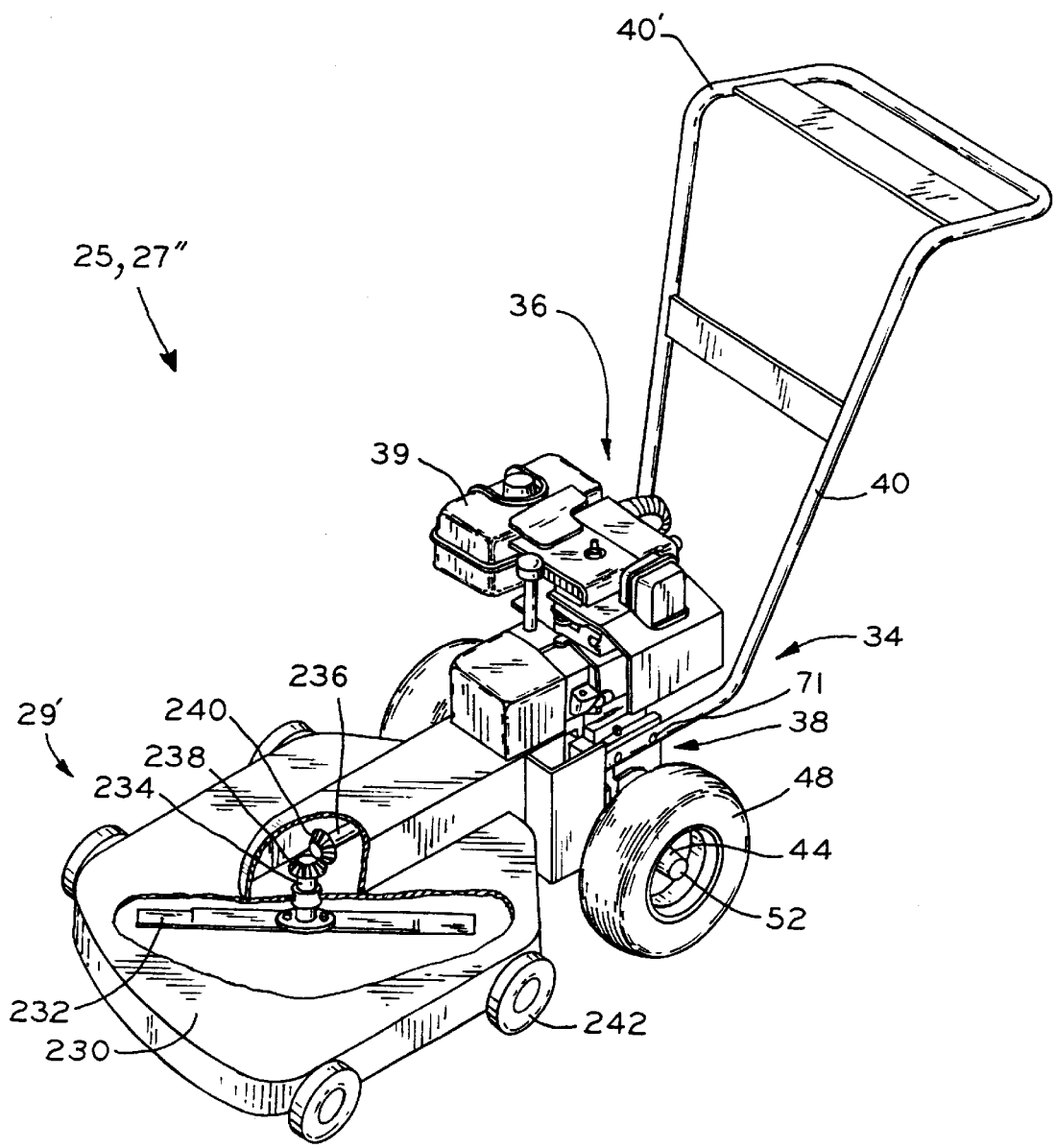
FIG_1B

FIG_5

FIG_6

FIG_11

FIG_12

FIG_13

IMPLEMENT HAVING ENGINE AND TRANSAXLE MODULE

CROSS REFERENCE TO RELATED APPLICATIONS

This application claims the benefit under Title 35, U.S.C. §119(e) of U.S. Provisional Application Ser. No. 60/184,243, entitled SNOW THROWER, filed on Feb. 23, 2000, as well as U.S. Provisional Application Ser. No. 60/184,477, entitled IMPLEMENT HAVING ENGINE AND TRANSAXLE MODULE, filed on Feb. 23, 2000.

BACKGROUND OF THE INVENTION

1. Field of the Invention

The present invention relates to lawn and garden implements such as tillers, mowers, and snow throwers, particularly those having an engine-driven transaxle for driving ground engaging wheels.

2. Description of the Related Art

Prior lawn and garden implements, for example, mowers, tillers and snow throwers, conventionally have an engine and a transaxle individually mounted to a frame, to which a handle is also attached. The frame is ordinarily unique to the particular implement, and may comprise a portion of the working device, which may be, for example, the deck or sickle bar assembly of a mower, the cultivating blade assembly of a tiller, or the auger assembly of a snow thrower. Consequently, for a manufacturer to accommodate the production of a variety of such prior implements, substantial tooling and facilities expenditures, as well as high variable costs associated with inventory and production control, may be incurred. Further, the consumer must purchase, store, and maintain separate and complete prior implement units, one for each particular task.

One solution to these problems is to provide an implement having interchangeable working devices, which provides the capability for the implement to alternately be a mower, a snow thrower, a tiller, a chipper/shredder, a sweeper, or other types of implements.

One such implement is a two-wheeled tractor manufactured by BCS America, Inc. of Matthews, N.C., which includes a transaxle to which a horizontal shaft engine is attached at one end thereof, and to which one of a plurality of interchangeable working devices may be attached at the opposite end thereof. The transaxle drives wheels located on its opposite sides, between the engine and the working device. A handle is attached to the transaxle, and may swing around same such that one of the engine and the working device is selectively disposed beneath the handle, at the end of the transaxle where the operator is located. The other of the engine and the working device is disposed at the end of the implement opposite that at which the operator is located. A problem with this design is that, because one of the engine and the working device is disposed beneath the handle and near the operator, the operator has minimal clearance space for walking behind the implement, or must stand a substantial distance away from the implement, making maneuvering of same more difficult. Additionally, when the working device is disposed at the rear of the implement, the working device is disposed close to the operator, who walks behind the implement. Depending upon the type of working device used, this could possibly present a dangerous condition. For example, the foot of the operator may contact the working device, which may have a moving blade, and become injured. Further, having the engine so near the operator is also undesirable because the engine emits exhaust and substantial heat while running. Moreover, having the engine or the working device so near the legs of the operator may adversely affect the operator's positioning, and impair the operator's ability to control the implement. It is desirable to provide an implement which includes one of a plurality of interchangeable working devices and which overcomes the above-mentioned concerns associated with previous such devices.

U.S. Pat. No. 5,971,881, issued Oct. 26, 1999, and assigned to the assignee of the present application, is expressly incorporated herein by reference, and discloses a transaxle which may be attached to an engine to form an engine and transaxle module, which engine and transaxle module may be assembled into an implement; however, this patent does not disclose that one of a plurality of interchangeable working devices may be connected to the engine and transaxle module.

Additionally, manually maneuvering a prior implement such as a snow thrower, for example, as might be commonly done while the snow thrower is in its unpowered state inside a garage, generally requires that the transaxle be placed in neutral before pushing or pulling the implement about. Such maneuvering can be done more easily if the snow thrower has a transaxle equipped with a pair of axles joined through a differential gear, which allows the two axles to rotate at different speeds, such that turns may be made without skidding the tires. Providing a transaxle with a differential gear set to join the two axles can contribute significantly to the cost of a transaxle however, and additionally requires a differential lock to prevent one of the wheels from slipping during operation, with the other wheel receiving little or no power. Without a differential lock, which adds cost and complexity to the transaxle, the implement may be rendered immobile for lack of traction at one of its wheels during operation.

Most prior implements thus have relatively inexpensive transaxles including a solid axle which extends from opposite sides of the transaxle housing. Such transaxles ensure that both wheels will be powered during operation but, if the wheels are rotatably fixed to the axles, manual maneuvering of the implement may be difficult because the wheels cannot rotate relative to one another. This can make maneuvering difficult because at least one of the tires will tend to skid or slide during turns, requiring much more effort to push or pull the implement.

The wheels of some implements, such as snow throwers, are often attached to the axles through removable shear pins which extend through aligned cross bores provided in the wheel hubs and the ends of the axle. To better facilitate manual maneuvering of a snow thrower having a solid axle, the shear pins are removed, the wheels are moved axially inward along the axle, and the shear pins are replaced through the cross bores in the axle. The wheels are now free to rotate relative to the axle, and the annular ends of the wheel hubs axially abut the shear pins to prevent the wheels from slipping off the ends of the axles. To reestablish driving connection between the transaxle and the wheels, the shear pins are removed from the axle cross bores, the cross bores of the wheel hubs and axle are realigned, and the shear pins are reinstalled therethrough, allowing the transfer of torque from the transaxle to the wheels through the shear pins. Although removable shear pins are useful for preventing damage to the transaxle, the engine which powers the transaxle and/or the coupling mechanism therebetween, it is inconvenient to remove and reinsert the shear pins, as described above, to merely manually maneuver the snow thrower about more easily. An inexpensive and simpler to use means for facilitating easy manual maneuvering of an implement which does not have a differential gear set, is thus desirable.

Further, it is well known in the art that implements having relatively high centers of gravity have a greater tendency to tip over vis-a-vis those having lower centers of gravity. Often, the transaxle contributes significantly to the mass of the implement, and thus it is desirable, in an effort to provide a more stable implement, to lower the center of gravity of the transaxle, thereby lowering the center of gravity of the implement as a whole.

SUMMARY OF THE INVENTION

In overcoming the above-mentioned problems associated with prior art implements and transaxles, the present invention provides an implement having an engine and transaxle module, including an engine having an output shaft and a transaxle having an input shaft, the engine and the transaxle rigidly and directly attached to one another in a vertically stacked orientation. The engine output shaft and the transaxle input shaft are operatively coupled through a flexible drive member, whereby the transaxle is driven by the engine, and the transaxle has at least one output shaft for driving ground engaging wheels. One of a plurality of interchangeable working devices is attached to the engine and transaxle module.

Various working devices may be interchangeably attached to the engine and transaxle module to comprise various implements, thereby providing a consumer with a single implement base to maintain and store. The implement base includes the engine and transaxle module, power transmission means between the engine and transaxle and between the module and the working device, ground-engaging wheels, and perhaps a single handle. The working devices are attached to the engine and transaxle module of the base to suit the task at hand, whether it be mowing, tilling, snow removal or transporting earth or debris, for example.

The implement can be, among other types, a tiller, rotating blade or sickle bar mower, snow thrower or powered barrow, the working device of which is directly attached to the engine and transaxle module, as is the handle for controlling the implement. The inventive engine and transaxle module and, in some cases, the handle, is interchangeable between various types of these implements, thereby reducing unique tooling and attendant facility requirements, as well as associated inventory and production control costs.

Additionally, the present invention provides an implement which is relatively easy to manually maneuver, and which includes an engine having an output shaft, a transaxle having an input shaft and a pair of axially aligned axles, the axles being selectively coupled together, wherein, when the axles are coupled together, the wheels are rotatably fixed together, and when the axles are not coupled together, the wheels are free to rotate relative to each other. The implement may be a snow thrower having an auger assembly connected to one of the engine and the transaxle, the auger assembly operatively coupled to one of the engine and the transaxle.

The vertically stacked orientation of the engine and transaxle allows both the engine and the transaxle to be located in front of the handle and on the opposite side thereof from the operator, which provides more room for the operator to walk behind the implement, and also decreases the distance between the center of gravity of the implement and the operator, thereby making maneuvering of the implement easier, as well as obviating the above-described problems associated with having either the engine or the working device located beneath the handle on the operator side of the implement.

Additionally, the vertically stacked orientation of the engine and transaxle of the engine and transaxle module places the weight of both the engine and the transaxle more directly over the driving wheels, which advantageously affords better traction between the driving wheels and the ground surface.

In one form, the present invention provides an implement, including an engine and transaxle module, including an engine having an output shaft, a transaxle having at least one axle, the axle operatively coupled to the output shaft through the transaxle, the engine and the transaxle rigidly and directly attached to one another in a vertically stacked orientation; a handle attached to the engine and transaxle module; a ground engaging wheel operatively coupled to each axle; and one of a plurality of interchangeable working devices attached to the engine and transaxle module.

In another form, the present invention provides an implement, including an engine having an output shaft; a transaxle operatively coupled to the engine output shaft and having a pair of axially aligned axles, the axles being selectively rotatably coupled together; a working device being powered by the engine; a handle, movement of the implement being controlled by an operator through the handle; and a ground-engaging wheel connected to each axle, the wheels being rotatably fixed to one another when the axles are rotatably coupled together, the wheels being free to rotate relative to one another when the axles are not rotatably coupled together.

In another form thereof, the present invention provides a transaxle, including a housing; and a pair of axially aligned axles rotatably supported in the housing, the axles being selectively coupled together, the axles being rotatably fixed to one another when the axles are coupled together, the axles being free to rotate relative to one another when the axles are not coupled together.

The present invention also provides an implement having a relatively low center of gravity, the transaxle of which has a housing including first and second housing portions which interface substantially along a plane, but the shafts within the transaxle need not lie along this plane.

In still another form thereof, the present invention provides a transaxle, including a housing including first and second housing portions which interface substantially along a first plane; at least one axle rotatably supported by the housing; reduction gearing operably coupled to the at least one axle, the reduction gearing including two parallel shafts on which are disposed a plurality of gears, the shafts lying in a second plane, the first and second planes being nonparallel; and at least one bushing supported by the housing, the bushing including a pair of shaft retaining portions, each shaft retaining portion respectively supporting one end of each of the parallel shafts, the second plane extending between the shaft retaining portions.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1B is a perspective view of a second embodiment of an implement according the present invention, the implement being a mower;

Figure 1A:
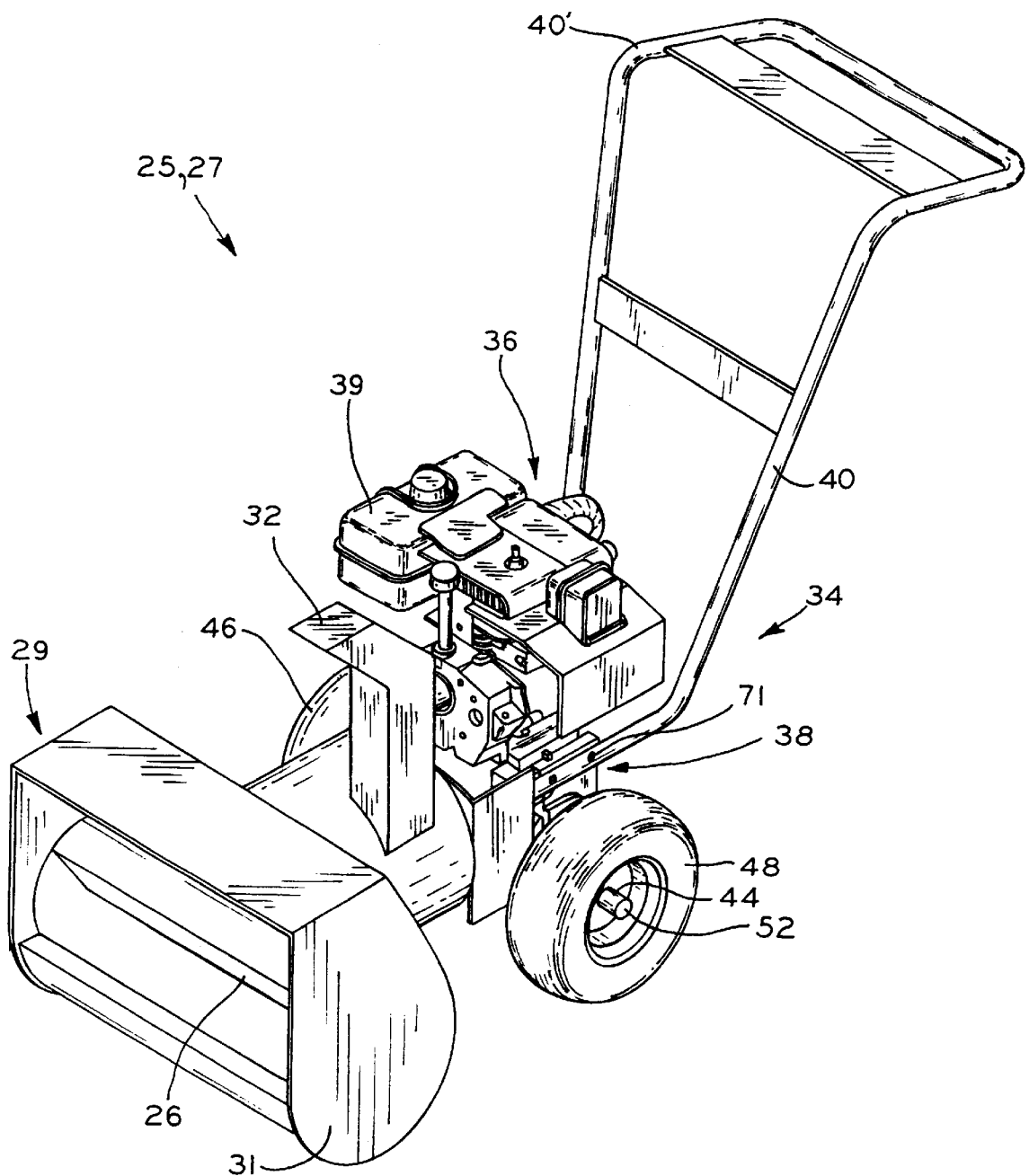
FIG. 1A is a perspective view of one embodiment of an implement according the present invention, the implement being a snow thrower.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION

Figure 2:
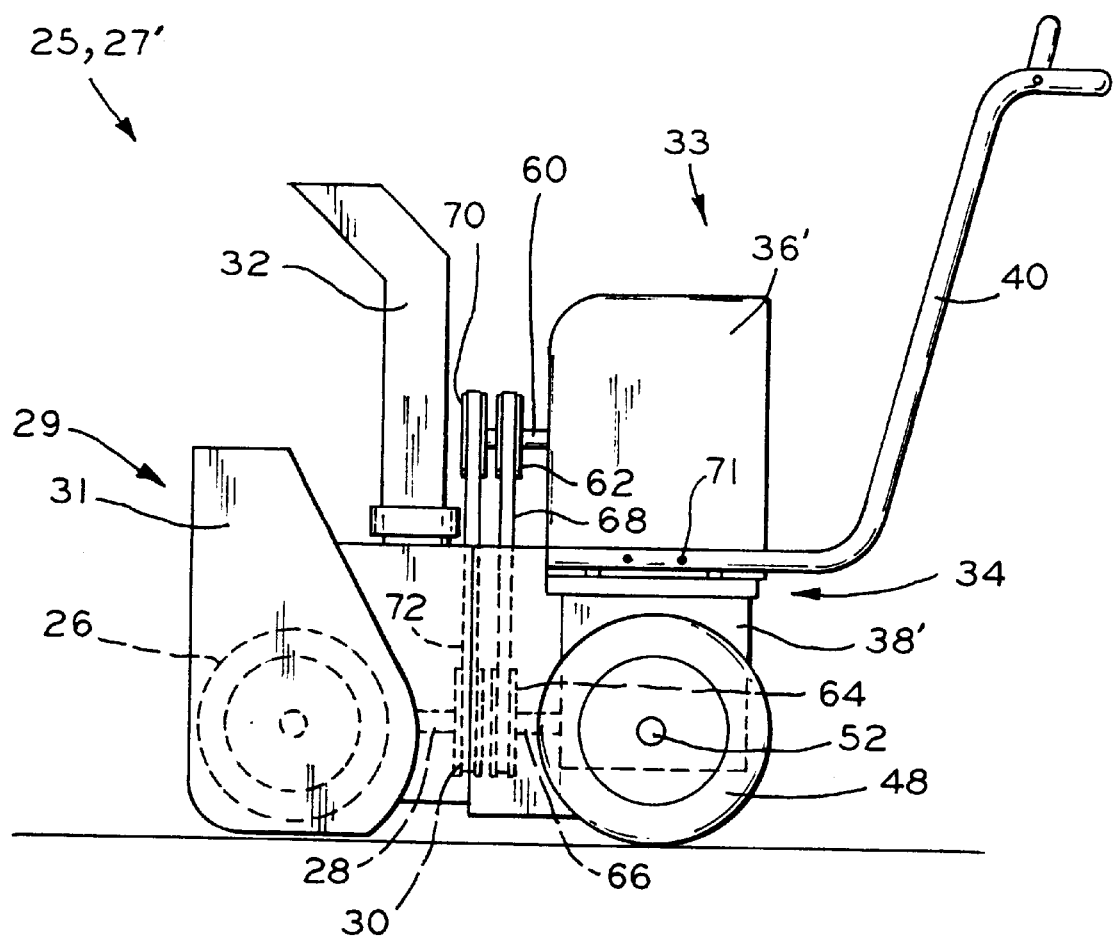
FIG. 2 is a schematic side view of an alternative embodiment of an implement according to the present invention.

FIGS. 1A, 1B, and 2 depict alternative embodiments of exemplary implements according to the present invention. Implement 25 is depicted therein as snow thrower 27, mower 27", and snow thrower 27' respectively, for example, two of several alternative implement configurations of implement 25.

Figure 3:
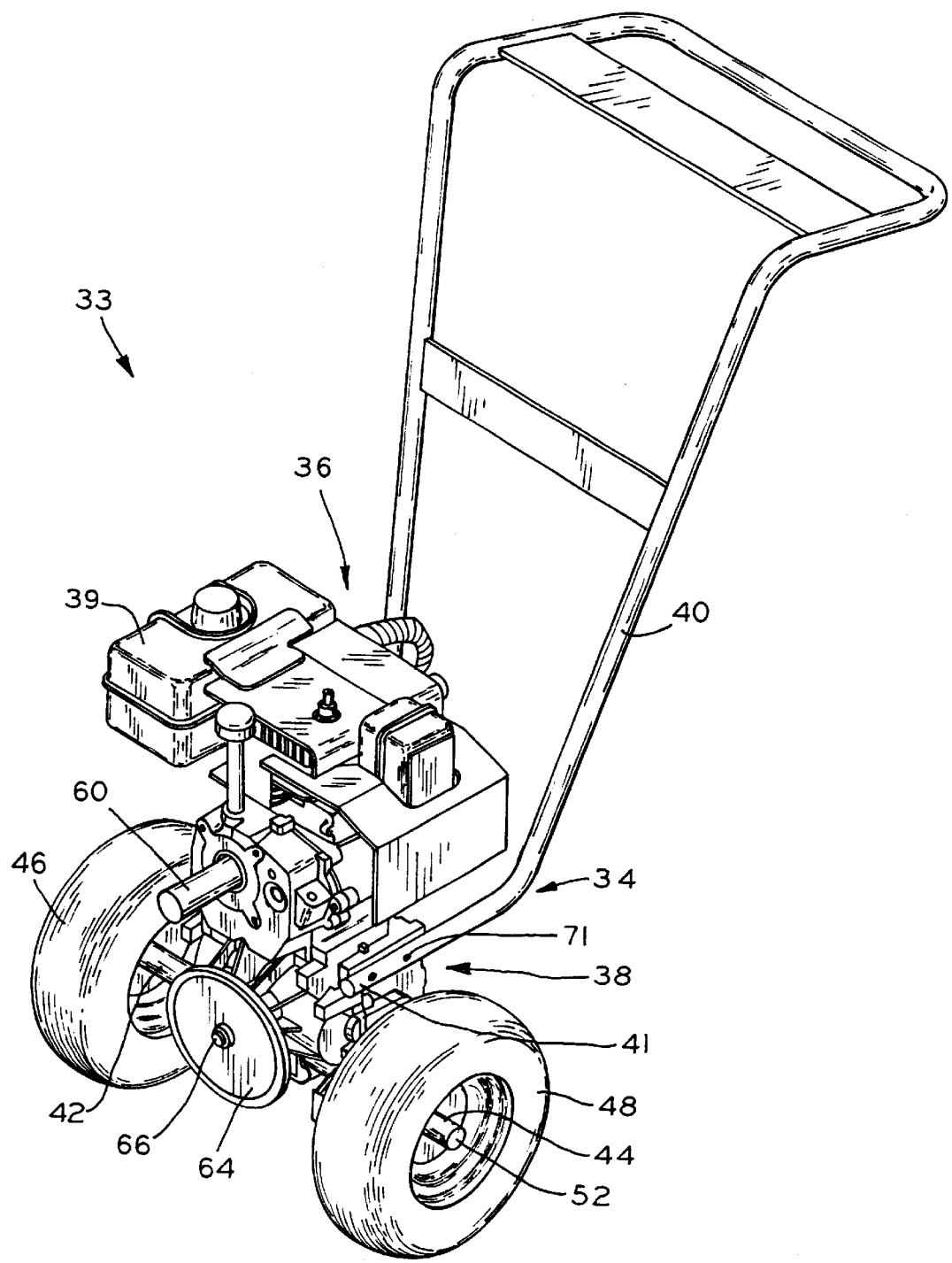
FIG. 3 is a perspective view of an exemplary base for the implements of FIGS. 1A and 1B, the base including a handle attached to an engine and transaxle module and having ground-engaging wheels.

Snow throwers 27 and 27' each include forwardly located auger assembly 29 having housing 31 within which rotates blade 26. In each embodiment, with reference to FIG. 2, blade 26 is driven in a well known fashion by shaft 28, upon which is rotatably fixed pulley 30. Auger assembly 29 also includes discharge chute 32 which rotates relative to housing 31. Snow throwers 27, 27' may be of a single or dual stage type, the latter including, in addition to blade assembly 26, an impeller (not shown) disposed in housing 31 near the inlet to chute 32. The impeller is also driven by shaft 28, perhaps at a faster rotational speed than is blade 26. Auger assembly housing 31 is attached to engine and transaxle module 34 (FIGS. 1A, 1B, and 3–5) or 34' (FIG. 2), which respectively comprise engine 36 or 36' and transaxle 38 or 38'. As shown in FIG. 3, base 33 comprises engine and transaxle module 34 and optionally, handle 40 and/or wheels 46, 48. Base 33 is common to each of snow thrower 27 and mower 27", regardless of which type of selectively interchangeable working device is attached thereto.

Engine 36, 36' is a two-stroke or four-stroke internal combustion engine of the basic type well known in the art and suitable for use in powering previous lawn and garden implements. As shown, engine 36, 36' is of the horizontal shaft type, and is rigidly mounted to transaxle 38, 38', respectively, through the crankcase thereof, which contains a supply of oil dedicated to lubrication and/or cooling of engine 36, 36'. The engine may also include fuel tank 39 attached thereto, as shown in FIG. 1.

Transaxle 38, 38' may be of known type, such as hydrostatic, or alternatively, a gear driven transaxle such as transaxle 38, which is described in further detail below. If gear driven, transaxle 38, 38' may be of the type having a fluid brake therein which controls the speed of an epicyclic gear arrangement, and thus the output speed of the transaxle. For example, transaxle 38, 38' may be of the basic type disclosed in above-mentioned U.S. Pat. No. 5,971,881 or U.S. patent application Ser. No. 09/498,692, filed Feb. 7, 2000, both assigned to the assignee of the present invention, the disclosures of which are expressly incorporated herein by reference. Alternatively, transaxle 38, 38' may of the known type and basic design exemplified by commercially available Model 406 or the 1300, 2500 or 2600 Series transaxles manufactured by Tecumseh Products Company. As is usual in previous implements having transaxles, the axles of transaxle 38, 38' are in driving engagement with ground engaging wheels 46, 48. Additionally, transaxle 38, 38' may be of a type with which belt 68 may be set and retained in its tensioned state such that whether any power is to be transferred from the engine to wheels 46, 48 is controlled through engagement control means provided within the transaxle; wherein the transaxle described in the above-mentioned U.S. Pat. No. 5,791,881 is of this type.

Figure 8:
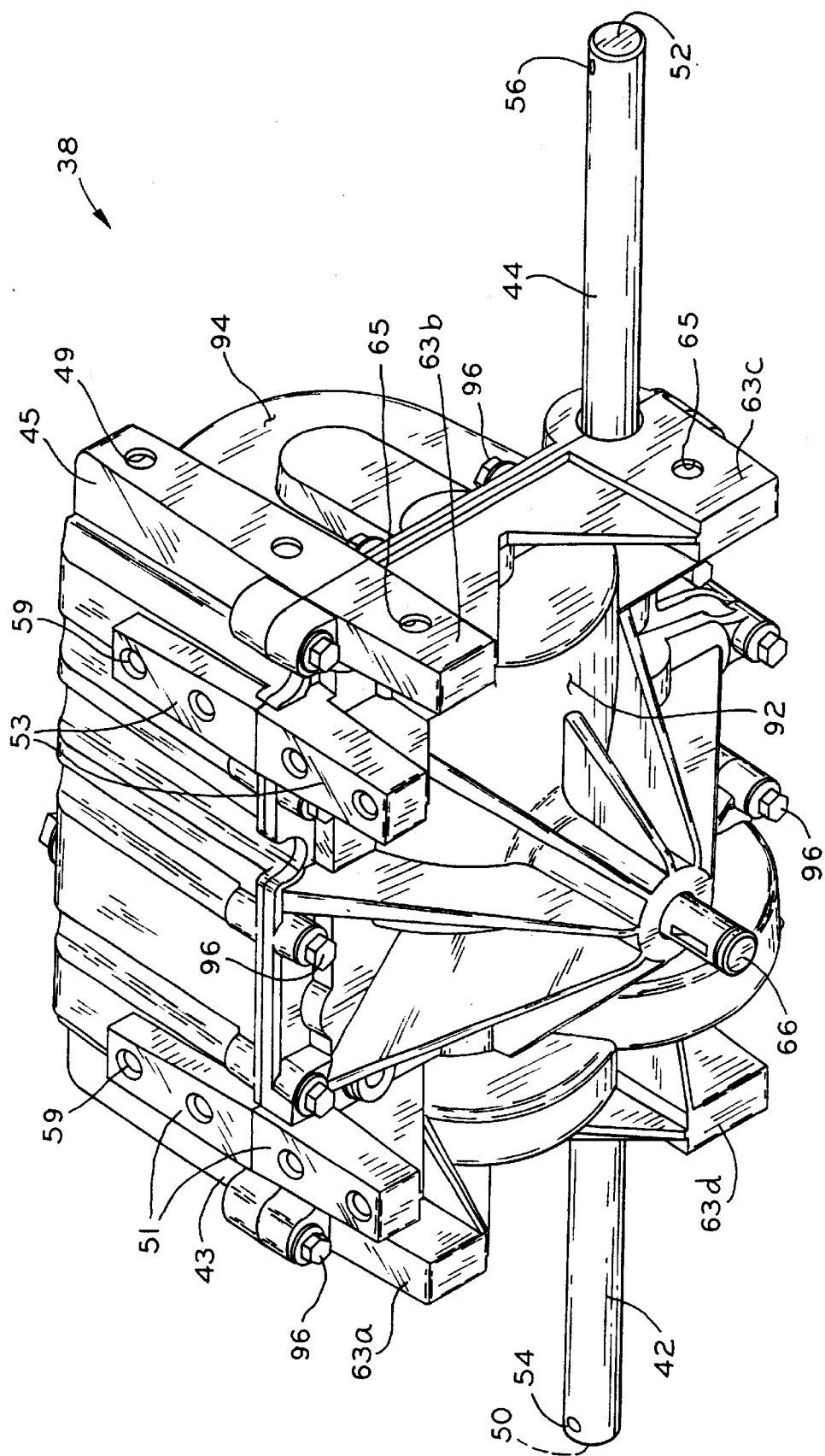
FIG. 8 is a second, upper front perspective view of the transaxle assembly of FIG. 7, shown without the pulley.
Figure 9:
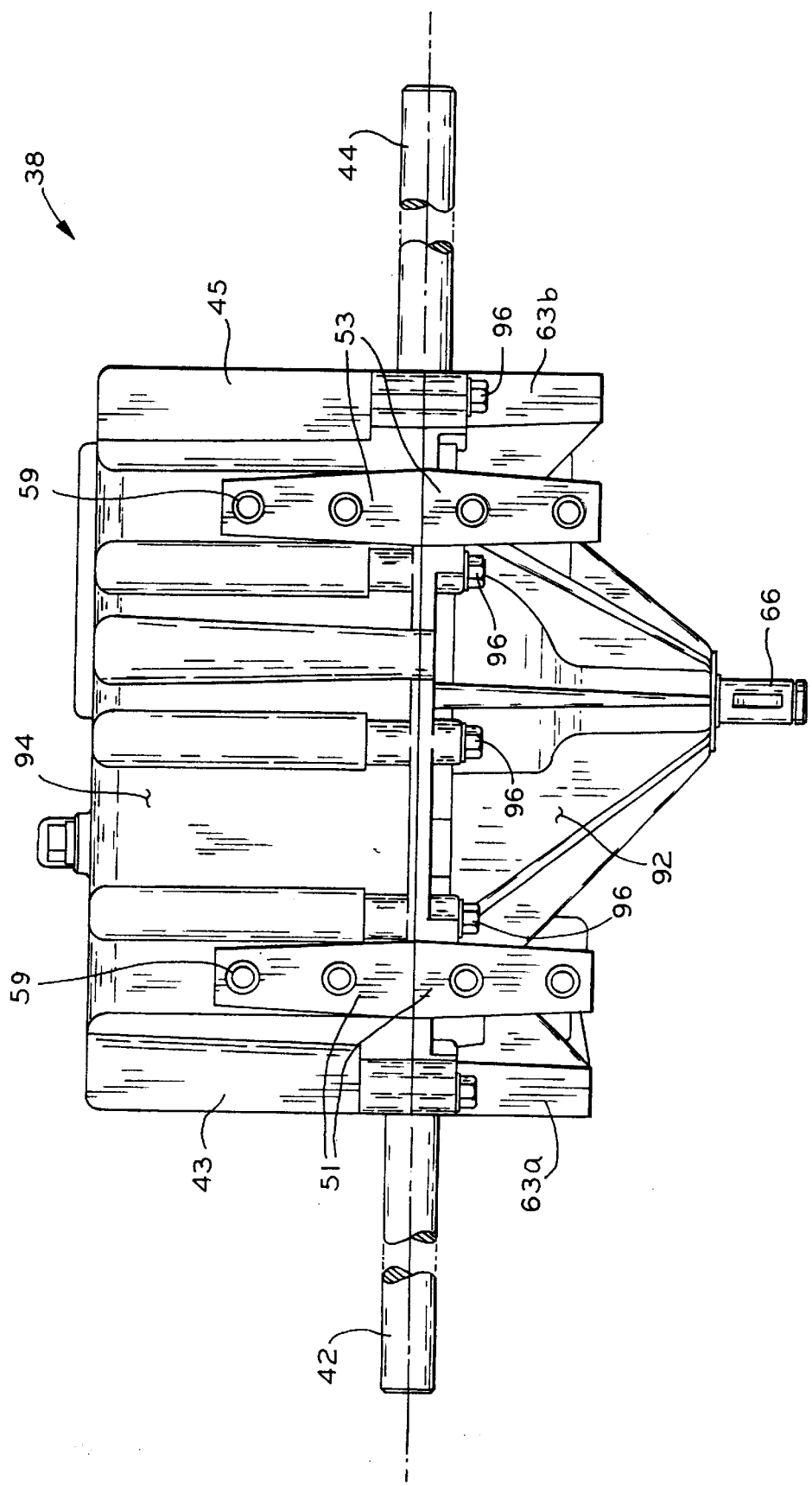
FIG. 9 is a top view of the transaxle assembly of FIG. 8.
Figure 10:
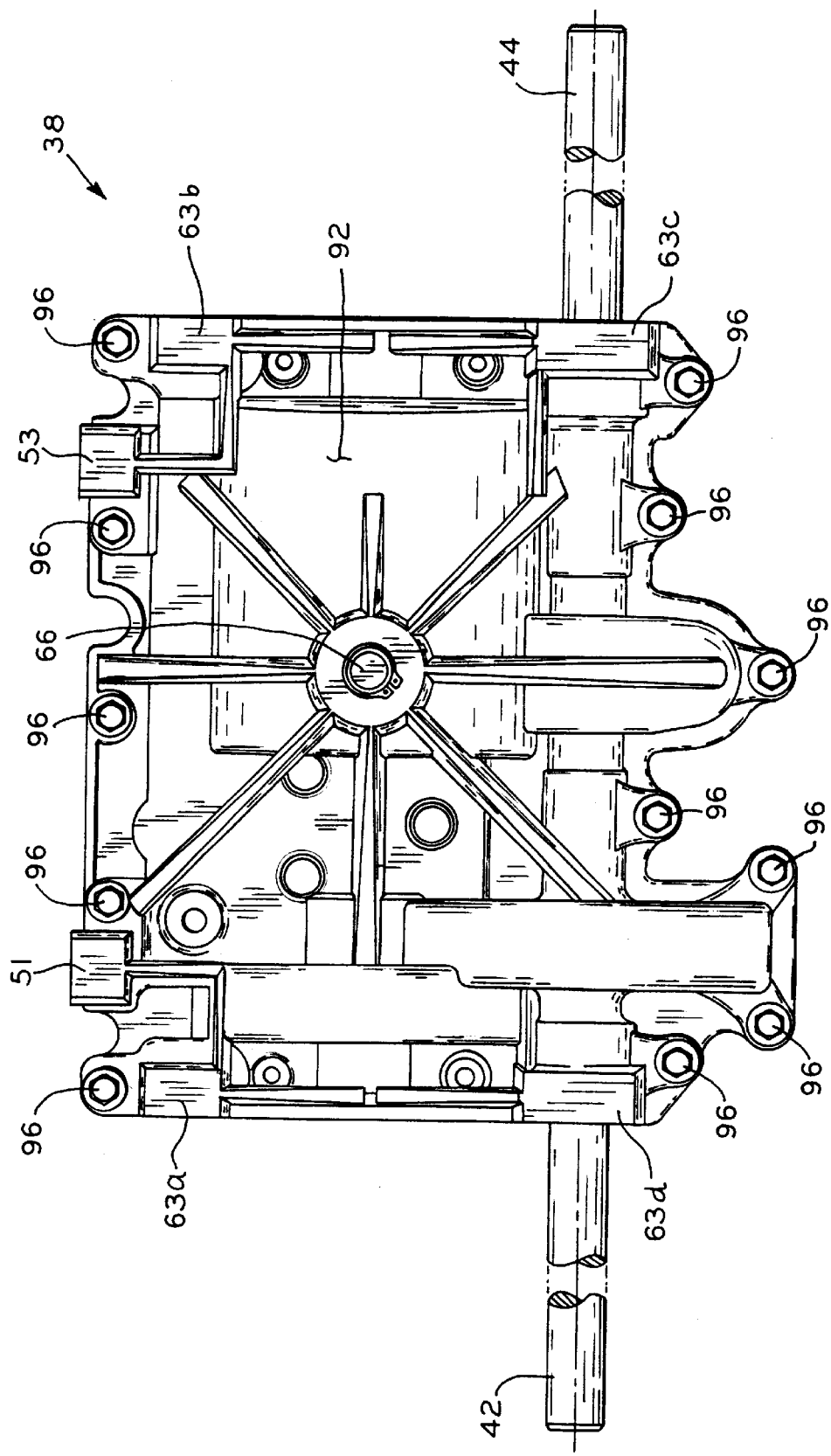
FIG. 10 is a front view of the transaxle assembly of FIG. 8.
Figure 11:
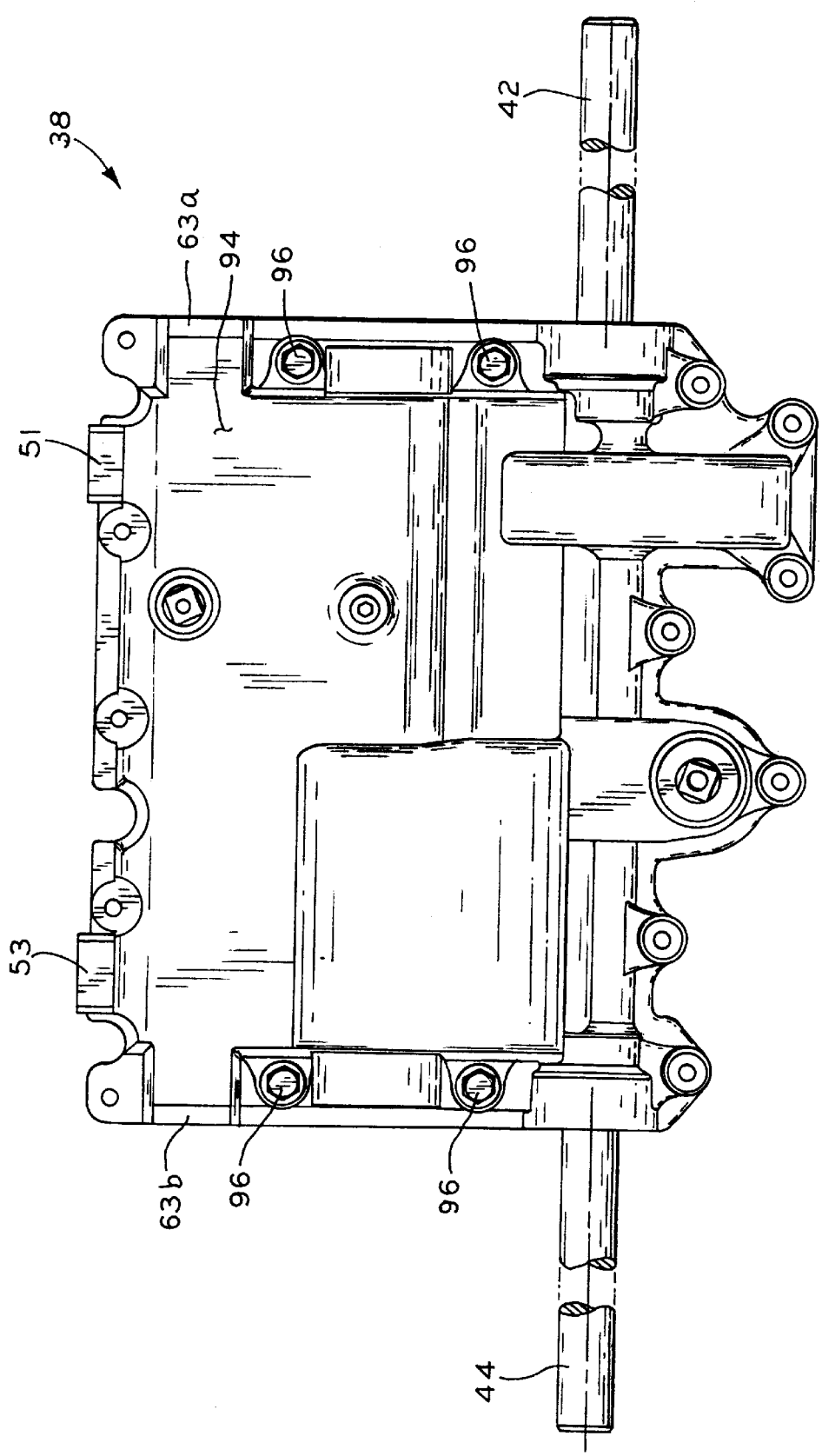
FIG. 11 is a rear view of the transaxle assembly of FIG. 8.

Referring to FIGS. 2 and 3, engine 36, 36' is provided with horizontal output shaft 60 having pulley 62 rotatably fixed thereto. Pulley 64 is rotatably fixed to input shaft 66 (FIG. 8) of transaxle 38, 38', and a flexible drive member such as belt 68 operatively couples pulleys 62 and 64. Notably, engine 36, 36' is of the type which, when running, is normally set at a particular running speed for extended periods, regardless of whether the implement is being propelled or is at rest. Belt 68 may be selectively brought into tensioned state by means of an adjustable idler clutch pulley (not shown) of the type well known in the art, and in that tensioned state will transfer power from the engine to the transaxle to propel snow thrower 27'.

Engine output shaft 60 is also provided with pulley 70 rotatably fixed thereto. A flexible drive member such as belt 72 extends between pulleys 70 and 30, and may be placed in a tensioned state by an adjustable idler clutch pulley (not shown) of the type well known in the art. Engagement of this idler clutch pulley places belt 72 in tension, and thus drives shaft 28 of the auger assembly directly from engine 36. Those skilled in the art will appreciate that input shaft 28 of the working device may alternatively be driven by or in tandem with input shaft 66 of transaxle 38, or by a power take off (PTO) shaft (not shown) which extends from the transaxle housing and is operatively coupled to shaft 28.

Base 33 includes rearwardly extending handle 40, which is attached to engine and transaxle module 34 and provided to allow an operator to control implement 25. In snow thrower 27, handle 40 is connected directly to transaxle 38, as shown in FIGS. 1 and 3; in snow thrower 27', handle 40 is connected directly to engine 36', as shown in FIG. 2; the difference in how handle 40 is attached being the primary difference between snow throwers 27 and 27'. Otherwise, the two snow thrower embodiments are substantially identical. Handle 40 may be of a type or design which is generic to various embodiments of implement 25, or may be uniquely and specifically designed to control only one or a few of the various embodiments of implement 25. In the latter case, in which a different handle may be required or desirable for controlling a particular implement configuration, base 33 may be considered to exclude handle 40; one of the advantages associated with providing a substantially generic base 33 is its ability to be interchangeably used in various types of implements. In either case, however, implement 25 includes a suitable handle having controls (not shown) of the type well-known in the art for controlling parameters such as, for example, engine speed, transaxle speed, transaxle direction and, depending on the type of implement 25, engagement of the working device.

The working device is shown in FIGS. 1A and 2 as auger assembly 29, however, another working device such as a cultivating blade assembly, mowing blade assembly, sickle bar assembly, sweeper assembly, or chipper/shredder attachment, for example, may also be interchanged therewith. For example, implement 25 is shown in FIG. 1B as mower 27", including forwardly located mower blade assembly 29' operatively mounted to engine and transaxle module 34. Mower blade assembly 29' includes deck 230 with wheels 242, blade 232 attached to blade shaft 234, and input shaft 236 driving blade shaft 234 through pinion gears 238, 240 mounted on blade shaft 234 and input shaft 236, respectively.

Figure 4:
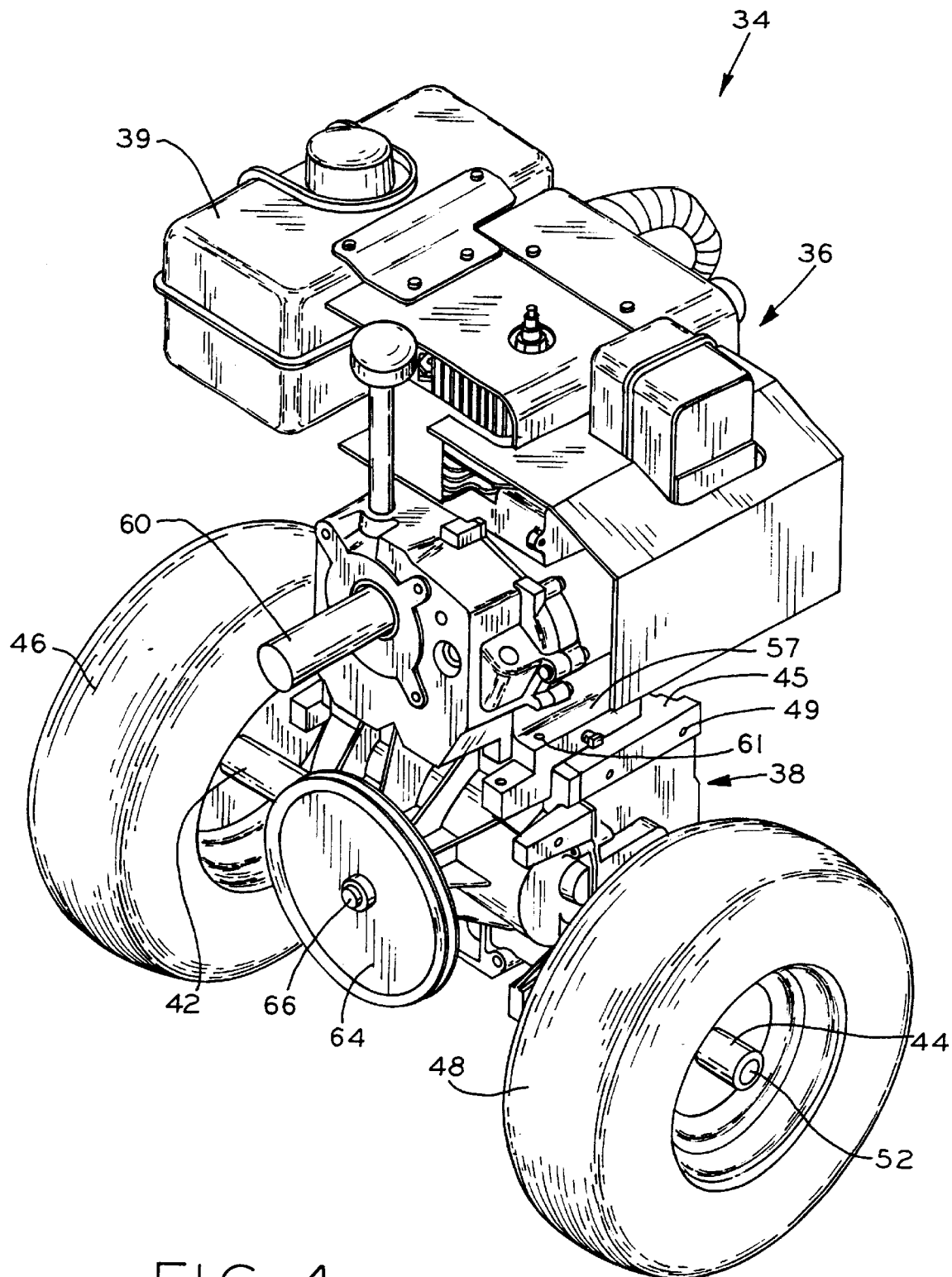
FIG. 4 is a perspective view of a portion of the base of FIG. 3, shown without the handle.

Referring now to FIG. 4, there is shown implement base 33 with handle 40 removed. As shown in FIG. 3, free ends 41 of handle 40, one of which is shown, are attached to bosses 43, 45 (FIGS. 6 and 7) provided on opposite lateral sides of transaxle housing 47. Bosses 43, 45 are provided with a plurality of tapped holes 49 into which are threadedly received bolts 71 which extend through handle free ends 41 for rigidly attaching handle 40.

Figure 5:
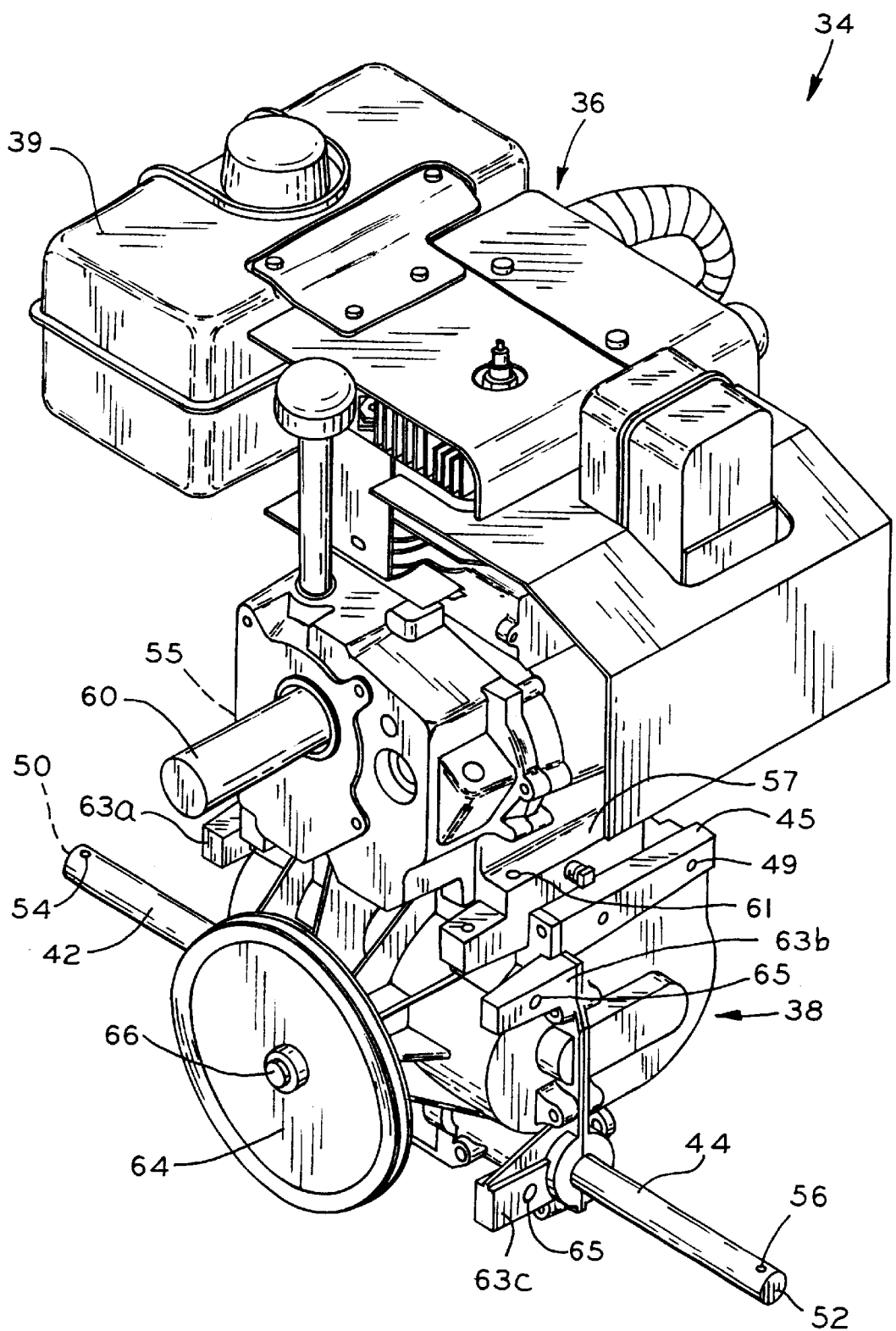
FIG. 5 is a perspective view of the engine and transaxle module of the implements of FIGS. 1A and 1B.
Figure 6:
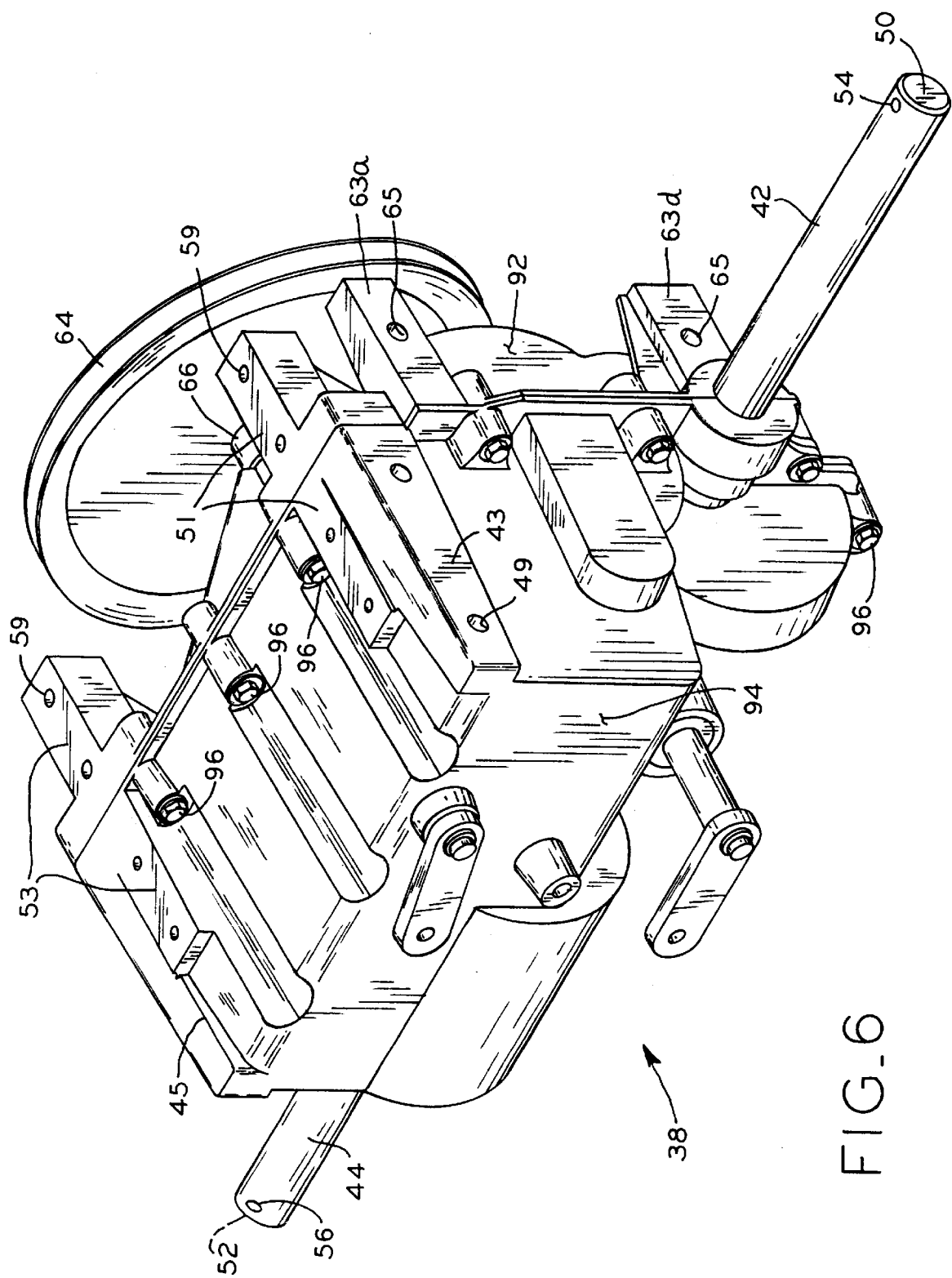
FIG. 6 is an upper, rear perspective view of the transaxle of the engine and transaxle module of FIG. 5.
Figure 7:
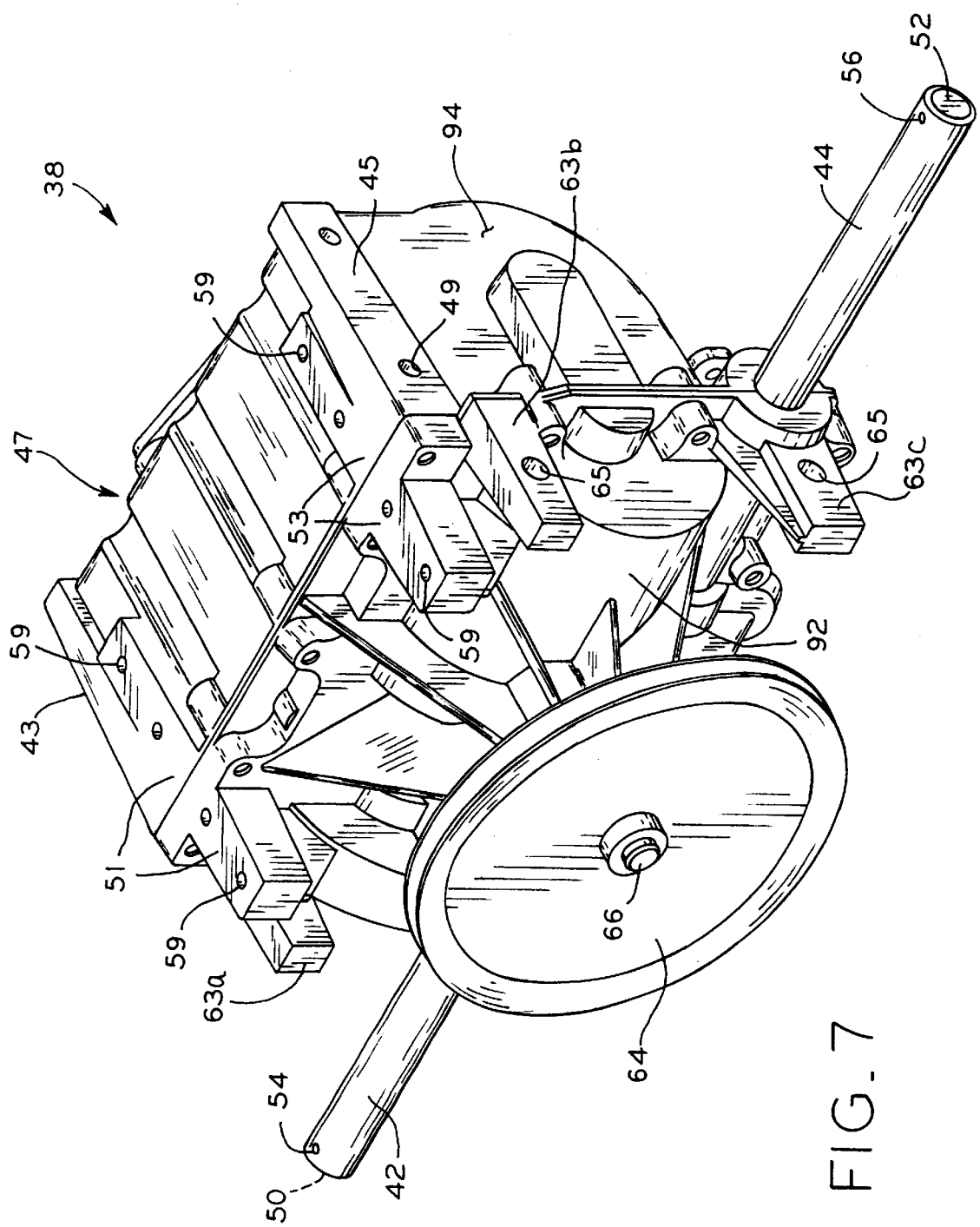
FIG. 7 is a first, upper front perspective view of the transaxle of FIG. 6, including a pulley mounted on the input shaft thereof.

Referring to FIGS. 6 and 7, it can be seen that housing 47 of transaxle 38 is provided with mounting bosses 51, 53 to which mounting lugs 55, 57 of engine 36 are attached. Bosses 51, 53 have an upwardly exposed surface in which are provided a plurality of tapped holes 59. As best seen in FIG. 5, mounting lugs 55, 57 of engine 36 are provided with mounting holes 61 which are aligned with tapped holes 59 of transaxle bosses 51, 53. Bolts (not shown) extend through mounting holes 61 and are threadedly received in holes 59. Hence, engine 36 is rigidly attached to transaxle 38.

Transaxle housing 47 is also provided with mounting lugs 63*a–d* to which the working device is attached. Each of lugs 63*a–d* is provided with tapped hole 65 extending therethrough. A working device such as, for example auger assembly 29, is attached to engine and transaxle module 34 by easily accessible fasteners (not shown) which are threadedly received in holes 65. Hence, the working device is rigidly attached to engine and transaxle module 34, as shown in FIG. 1A.

As is usual in previous implements having transaxles, axles 42, 44 of the transaxle are in respective driving engagement with ground engaging wheels 46, 48. In the general manner of previous snow throwers, axle outboard ends 50, 52 may be provided with cross bores 54, 56, respectively, which are aligned with cross bores (not shown) extending through the hubs of the wheels, a removable shear pin (not shown) provided for transferring torque from the axle to the wheel. Also, as described above, wheels 46, 48 may be free to rotate about the axles by sliding their hubs inwardly of respective axle outboard ends 50, 52, the shear pins extending only through cross bores 54 and 56 but not the cross bore provided in each wheel hub; the pins prevent the wheels from sliding off the ends of the axles and allow the snow thrower to free wheel. In accordance one embodiment of the present invention, however, snow thrower 27, 27' may be easily free wheeled without removing and reinstalling the shear pins, as will be described further hereinbelow.

Wheels 46, 48 of a common size and tire tread design may be selected to accommodate the various configurations of implement 25. Alternatively, wheels of different sizes or tire tread designs may be installed on implement 25 to best suit the work to be performed by the various types of implements; that is, different wheels may be installed on implement 25 which are matched with the various working devices. For example, wheels having wide tires with an aggressive tread pattern may be installed when implement 25 is configured as a tiller, whereas wheels having narrow, studded tires may be installed when implement 25 is configured as a snow thrower. In the case of wheels of different sizes or tread designs being installed on implement 25 to better suit the variety of implement types, base 33 may be considered to exclude wheels 46, 48. As mentioned above, one of the advantages associated with providing a substantially generic base 33 is its ability to interchangeably accommodate various types of implements. In either case, however, implement 25 comprises suitable wheels 46, 48. Hence, in its most elemental form, base 33 may consist only of the engine and transaxle module, one embodiment of which, module 34, is shown in FIG. 5.

Referring to FIGS. 8–12, the housing of transaxle 38 comprises respective front 92 and rear 94 housing portions which mate together along a substantially vertical split line, and are attached together by means of a plurality of bolts 96. Notably, the surfaces of lugs 63*a–d* may extend over both the front and rear housing portions.

Figure 13:
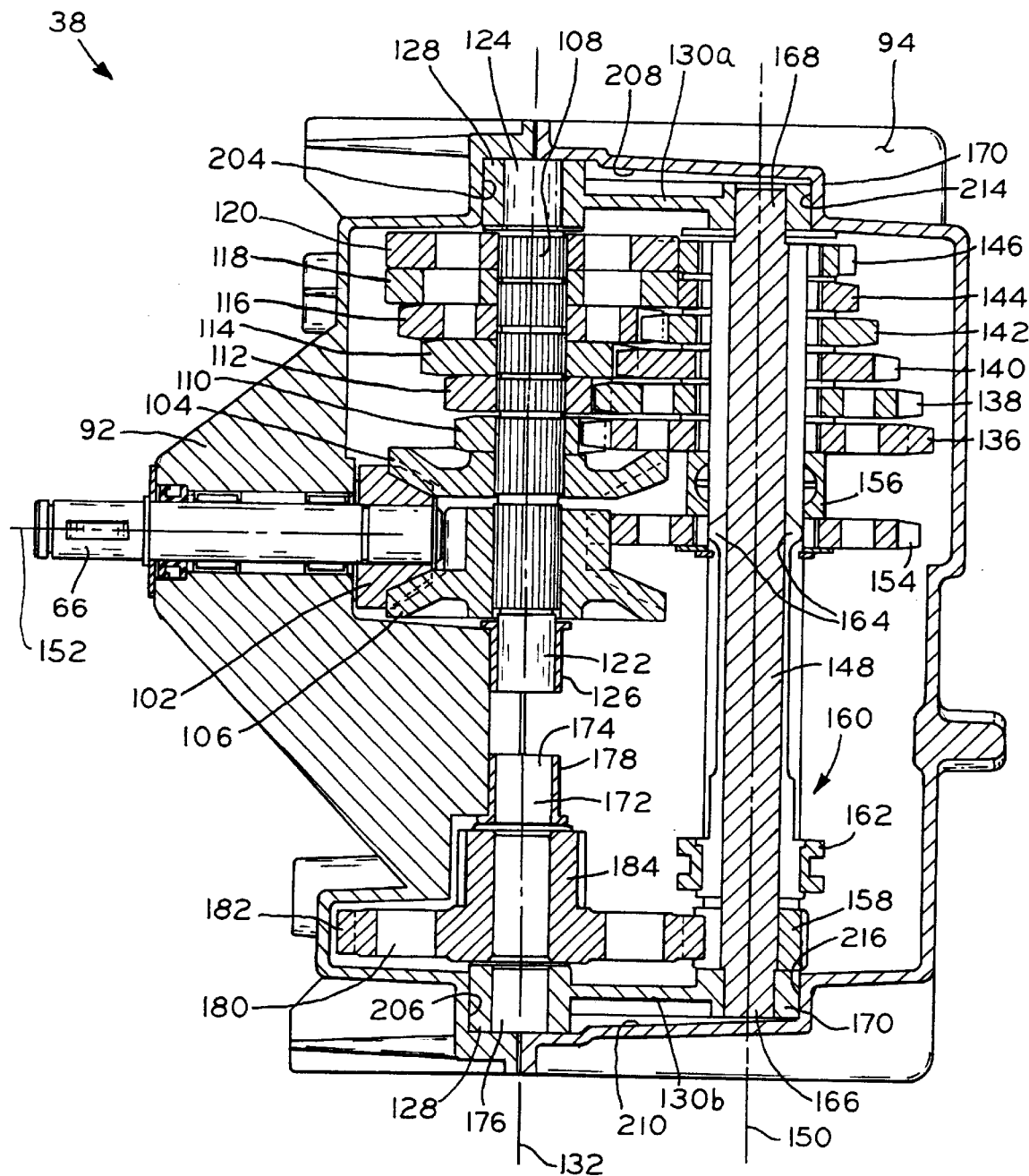
FIG. 13 is a sectional view along line 13—13 of FIG. 12.

The transaxle input shaft and one of the axles are operatively coupled through reduction gearing as follows. Referring now to FIG. 13, transaxle input shaft 66, which is supported on bearings within front housing portion 92, has pinion gear 102 rotatably fixed thereto. Pinion gear 102 is intermeshed with forward and reverse drive gears 104, 106, respectively, which are disposed on first drive shaft 108. Forward drive gear 104 is rotatably fixed to first drive shaft 108, which is thus driven by input shaft 66. Reverse drive gear 106 is rotatably disposed on first drive shaft 108, and rotates in a direction opposite to that in which shaft 108 and gear 104 rotate. Also rotatably fixed to first drive shaft 108 are a plurality of forward drive gears 110, 112, 114, 116, 118 and 120 of successively increasing diameter. Opposite ends 122 and 124 of shaft 108 are respectively journalled in bearing 126 and large end or shaft retaining portion 128 of bearing block or bushing 130a. Shaft 108 has axis of rotation 132 which lies in a plane on which front and rear housing portions 92, 94 meet. Bearing 126 is captured in mating recesses provided in each housing portion. As will be discussed further hereinbelow, bushing 130a, and identical bushing 130b, are captured in elongate recesses formed by the front and rear housing portions, at opposite sides of the transaxle.

Figure 14:
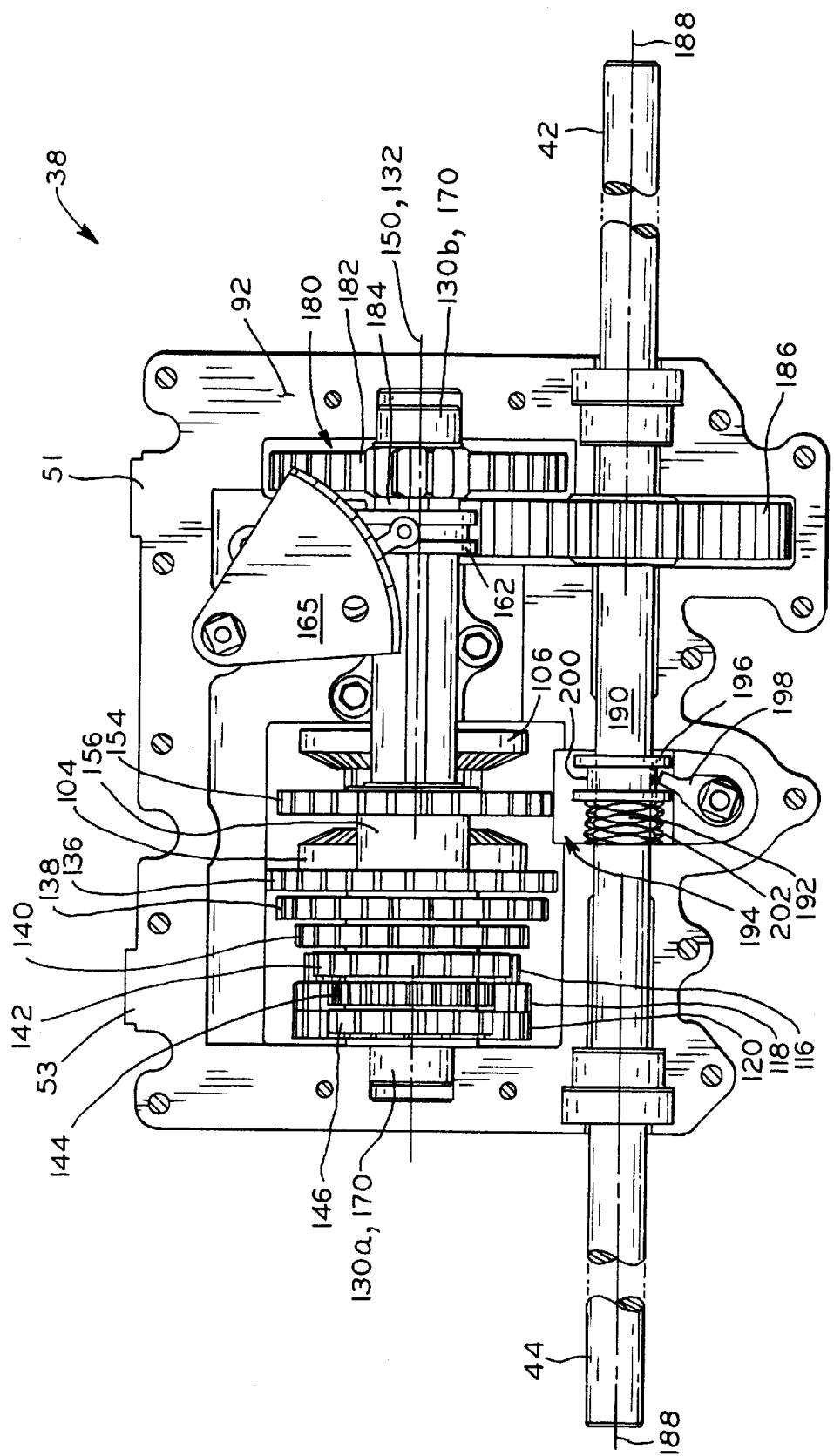
FIG. 14 is a sectional view generally along line 14—14 of FIG. 12, also showing the shift mechanism and shiftable gears of the transaxle, as well as an axle coupling mechanism in accordance with the present invention.
Figure 15:
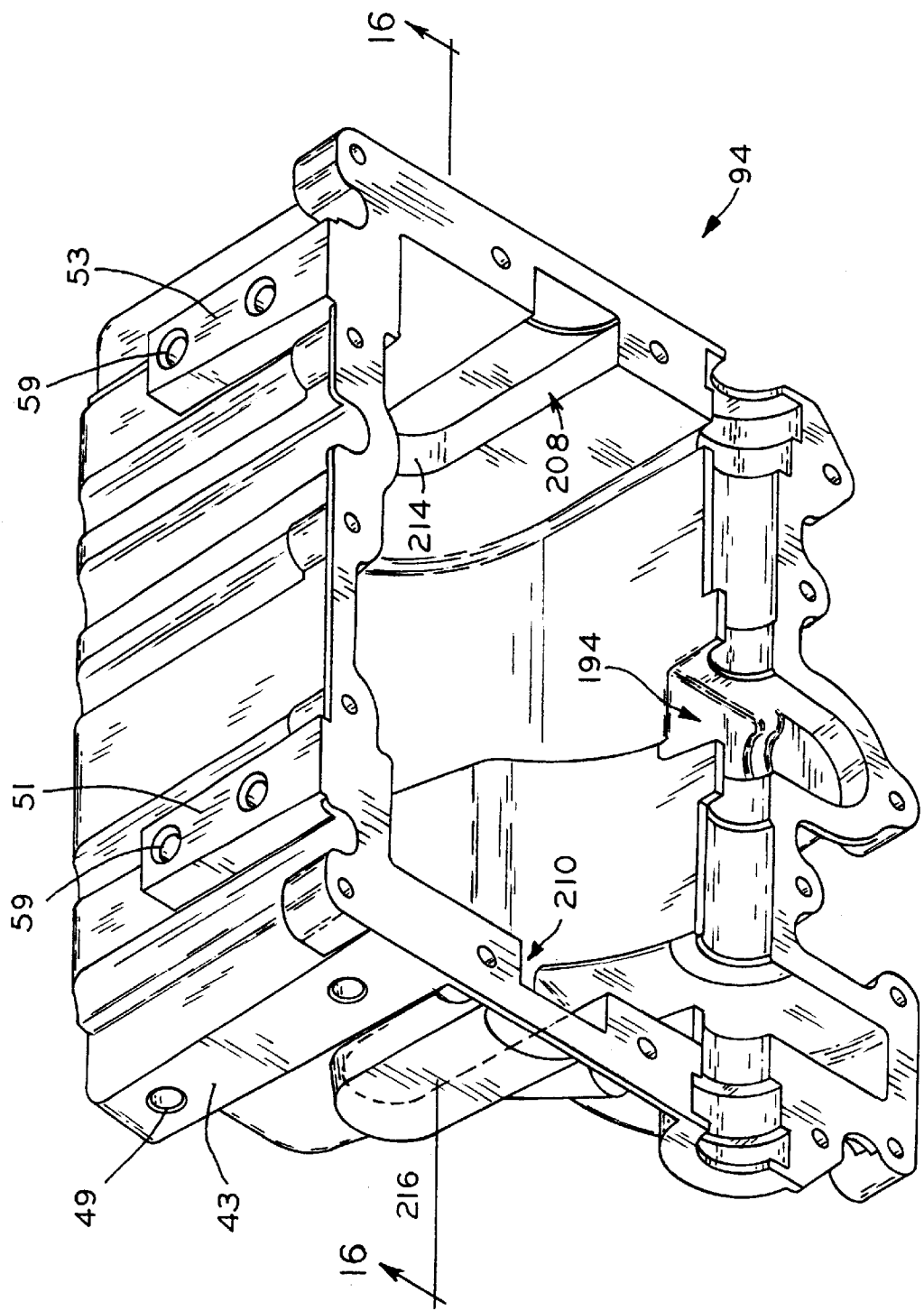
FIG. 15 is an upper perspective view of the rear transaxle housing portion.
Figure 16:
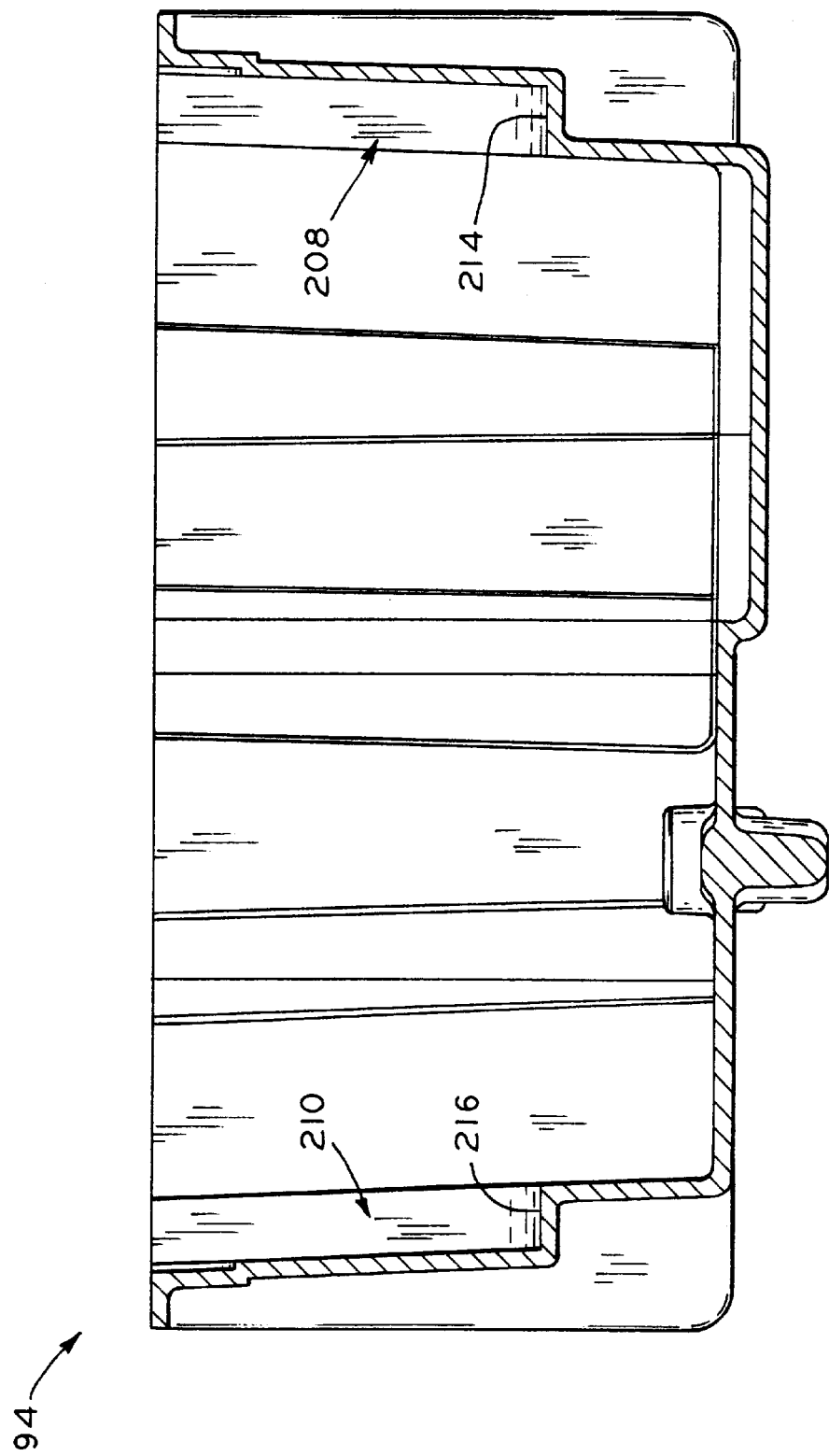
FIG. 16 is a sectional view along line 16—16 of FIG. 15.
Figure 17:
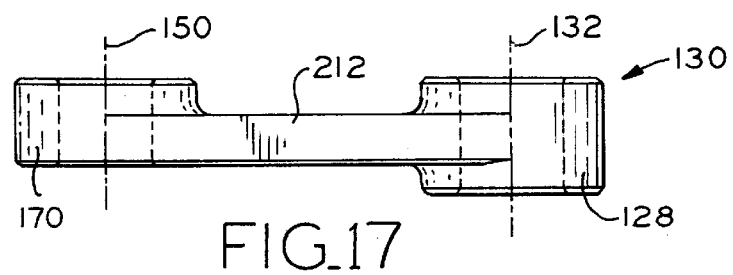
FIG. 17 is a top or bottom view of a bearing bushing according to the present invention.
Figure 18:
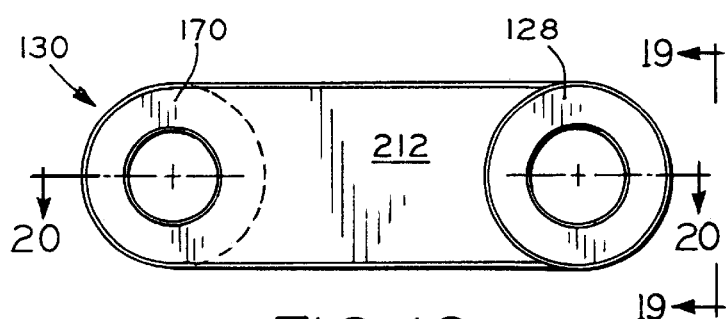
FIG. 18 is a side view of the bushing of FIG. 17.
Figure 19:
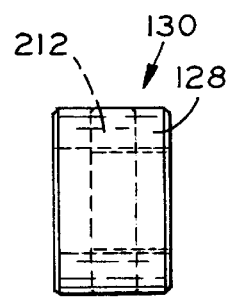
FIG. 19 is an end view along line 19—19 of FIG. 18.
Figure 20:
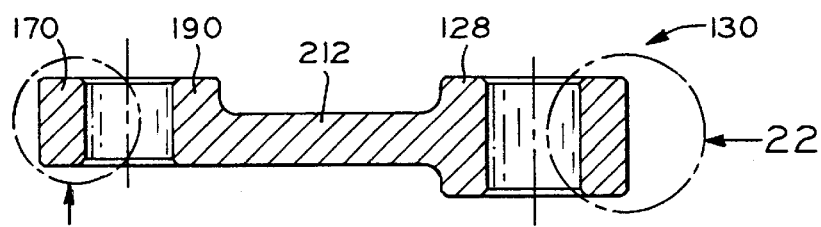
FIG. 20 is a sectional view along line 20—20 of FIG. 18.
Figure 21:
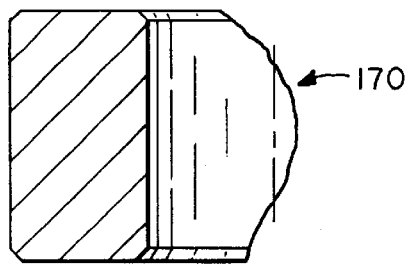
FIG. 21 is an enlarged view of encircled area 21 in FIG. 20.
Figure 22:
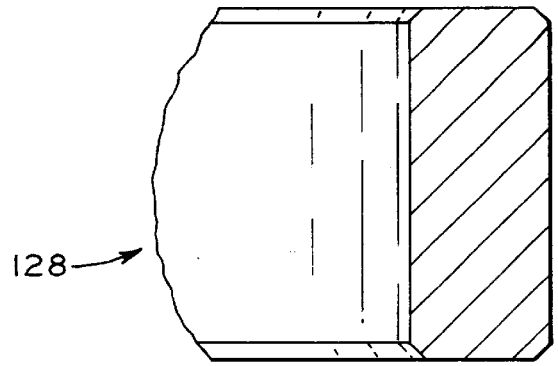
FIG. 22 is an enlarged view of encircled area 22 in FIG. 20.

Intermeshed with each of forward drive gears 110, 112, 114, 116, 118 and 120 are corresponding forward driven gears 136, 138, 140, 142, 144 and 146, which are individually rotatably disposed on shift shaft 148, which has axis of rotation 150. Axes 132 and 150 are parallel, and lie in a plane with axis of rotation 152 of input shaft 66. Reverse driven gear 154 is also rotatably disposed on shift shaft 148 and is intermeshed with reverse drive gear 106. Disposed between forward driven gear 136 and reverse driven gear 154 is neutral spacer 156, which is also rotatably disposed on shift shaft 148. Shift shaft 148 has rotatably fixed thereto spur gear 158. Spur gear 158 is driven in the forward direction, at different speeds for a given input shaft 66 speed, by shaft 148 being linked to one of forward driven gears 136, 138, 140, 142, 144 or 146; spur gear 158 remains undriven by shaft 148 being linked to neutral spacer 156; and spur gear 158 is driven in the reverse direction, at a single speed directly corresponding to the speed of input shaft 66. The linkage of shaft 148 to the forward or reverse driven gears, or the neutral spacer disposed thereon, is by means of a key shift mechanism 160 of the type well known in the art. Generally, movement of shift collar 162 along axis 150 selectively engages keys 164 with one of the driven gears or the spacer disposed on shaft 148. Keys 164 move axially along shaft 148, but are adapted to rotate therewith. Thus, shaft 148 is driven to follow the movement of the driven gears, or remains undriven by the neutral spacer, depending on which is selectively engaged with keys 164. Collar 162 is axially moved along shaft 148 by pivoting shift arm 165 (FIG. 14), which is rotated by shifter means (not shown) external to transaxle 38 and which may be controlled from handle assembly 58 described above. As shown in FIG. 13, keys 164 are engaged with reverse driven gear 154. Key shift transaxles or transmissions are disclosed in the following patents, each of which is expressly incorporated herein by reference: U.S. Pat. No. 3,812,735 to von Kaler et al., issued May 28, 1974; U.S. Pat. No. 4,103,566 to von Kaler et al., issued Aug. 1, 1978; U.S. Pat. No. 4,212,210 to von Kaler et al., issued Jul. 15, 1980; U.S. Pat. No. 5,063,794 to von Kaler, issued Nov. 12, 1991; and U.S. Pat. No. 5,094, 121 to von Kaler, issued Mar. 10, 1992.

Opposite ends 166 and 168 of shift shaft 148 are journalled in small ends or shaft retaining portions 170 of identical bushings 130a and 130b. Countershaft 172 lies along axis 132 and has its opposite ends 174 and 176 respectively journalled in bearing 178 which, like bearing 126, is captured in mating recesses provided in each housing portion, and in large end 128 of bushing 130b. Double spur gear 180 has integral large diameter 182 and small diameter 184 gear portions and is rotatably disposed on countershaft 172. Large diameter gear portion 182 is intermeshed with spur gear 158. Small diameter gear portion 184 is intermeshed with large gear 186 which is rotatably fixed to axle 42. Thus, input shaft 66 is operatively coupled to axle 42.

Figure 23:
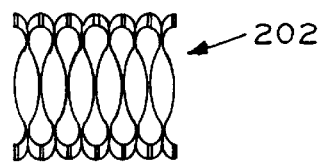
FIG. 23 is a view of the spring of the axle coupling mechanism of FIG. 14.

Axles 42 and 44 extend along axis 188, which is parallel with and vertically below axis 132 common to shafts 108 and 172. Axles 42, 44 are journalled between the interfitting front and rear housing portions of the transaxle in a well-understood fashion. Ends 190 and 192 of axles 42 and 44, respectively, abut or nearly abut in cylindrical cavity 194 formed by recesses provided in front and rear housing portions 92 and 94. Axle ends 190 and 192 are each splined, and are selectively engaged through annular collar 196 having a splined inner diameter. Collar 196 is moved along axis 188, and is at all times rotatably fixed to axle 44, the splines of which are long enough to accommodate collar 196 wholly thereon in a first, disengaged position. Collar 196 is moved between its first, disengaged position, in which axles 42 and 44 are not operatively coupled together, and a second, engaged position, in which the splines of collar 196 engage the splines of both axles, by means of pivoting engagement fork 198, the tine of which is engaged in annular groove 200 of the collar. Fork 198 is rotated by disengagement means (not shown) external to transaxle 38 and which may be controlled from handle assembly 58 described above. Collar 196 is urged into its second, engaged position by means of spring 202, which is best shown in FIG. 23. Spring 202 may be part number C100-L7 manufactured by Smalley, and is disposed about shaft 44 in abutting contact with a side of cavity 194 and the interfacing annular surface of collar 196. By moving fork 198 from its second, engaged position (shown in FIG. 14) to its first, disengaged position against the force of spring 202, axles 42 and 44 are free to rotate relative to one another, and the inventive snow thrower can be easily manually maneuvered about, for wheels 46, 48 will not slide or skid on the floor or ground. By disengaging axles 42 and 44 through axial movement of splined collar 196, relative rotation of the wheels can be easily and conveniently had without resorting to the removal and reinstallation of shear pins at the wheel hubs, as described above with respect to previous snow throwers.

Referring now to FIGS. 13, and 17–22, bushing 130, of which there are two (130a and 130b) in transaxle 38, may be a sintered powdered metal part or a machined casting. Semi-cylindrical recesses 204, 206 are provided in front housing portion 92, into which large ends 128 of bushings 130 are fitted. Rear housing portion 94 is provided with elongate recesses 208, 210 into which elongate web 212 of bushings 130 extends, small bushing ends 170 fitted within semi-cylindrical ends 214 and 216 of elongate recesses 208 and 210, respectively.

Figure 12:
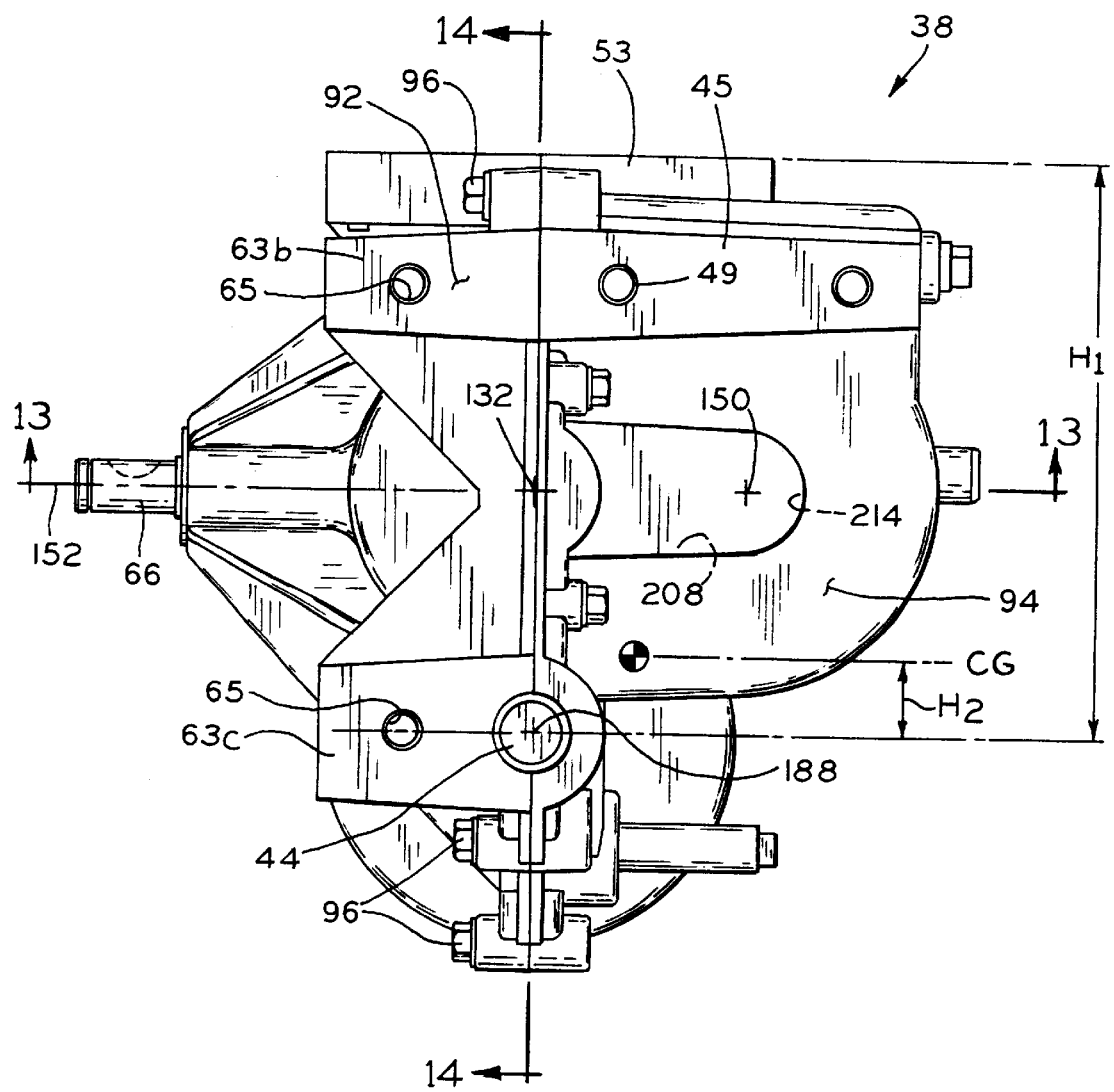
FIG. 12 is a left side view of the transaxle assembly of FIG. 8.

As installed, bushings 130 are substantially horizontal, thereby placing shift shaft 148 directly behind, rather than below, drive shaft 108 and/or countershaft 172. Elongate rear housing recesses 208, 210 and bushing 130 fitted therein thus provide a means of easily packaging drive shaft 108, shift shaft 148, countershaft 172 and axles 42, 44 along three separate, parallel axes (132, 150 and 188) while minimizing the height $H_1$ (FIG. 12) of the transaxle and without necessitating more than two housing portions. For given gear diameters, providing only two of these three axes in each of two perpendicular planes shortens the distance between the drive shaft or countershaft (108, 172) and the axles (42, 44), and thus the height of the transaxle. The first plane contains axes 132 and 188, and is disposed substantially along the interface of housing portions 92, 94. The second plane contains axes 132 and 150, as well as shaft retaining portions 128 and 170 of bushings 130, and is disposed at angle with respect to the first plane. As shown in FIG. 12, the second plane is disposed at a 90° angle with respect to the first plane, for example, however, such angle may vary substantially. The resultant transaxle thus has a center of gravity (CG), which may be located approximately as shown in FIG. 12, at vertical distance $H_2$ above the axles; distance $H_2$ comparatively shorter than in previous transaxles having only two housing portions. Thus, snow thrower 27, 27' provides improved stability and casting simplicity.

Additionally, the vertically stacked orientation of engine 36 and transaxle 38, as shown in FIG. 1, allows each of engine 36, transaxle 38, and the working device to be disposed forward of extending portion 40' of handle 40, while extending portion 40' of handle extends rearwardly of engine 36 and transaxle 38, thereby providing an operator with a maximum amount of space behind handle 40 for walking, as well as shortening the distance between the operator and the center of gravity of implement 25, which makes maneuvering implement 25 easier.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An implement, comprising:
   an engine and transaxle module, comprising;
      an engine having an output shaft;
      a transaxle having at least one axle and a variable speed change mechanism, said variable speed change mechanism having an input speed and an output speed, said variable speed change mechanism having a variable ratio of said input speed to said output speed, said axle operatively coupled to said output shaft through said variable speed change mechanism, said engine and said transaxle rigidly and directly attached to one another in a vertically stacked orientation;
      a handle attached to said engine and transaxle module;
      a ground engaging wheel operatively coupled to each said axle; and
   one of a plurality of interchangeable working devices attached to said engine and transaxle module.

2. The implement of claim 1, wherein said transaxle includes an input shaft operatively coupled to said output shaft.

3. The implement of claim 1, wherein said working device includes a moving blade.

4. The implement of claim 3, wherein said working device includes a rotating blade.

5. The implement of claim 1, wherein said implement is a snow thrower, and said working device is an auger assembly.

6. The implement of claim 1, wherein said implement is a mower, and said working device is a mower assembly.

7. The implement of claim 1, wherein said handle extends rearwardly of said engine and transaxle module, and said working device is disposed forwardly of said engine and transaxle module.

8. An implement, comprising:
   an engine having an output shaft;
   a transaxle operatively coupled to said engine output shaft and having a pair of axially aligned axles, said axles being selectively rotatably coupled together;
   a working device being powered by said engine;
   a handle, movement of said implement being controlled by an operator through said handle; and
   a ground-engaging wheel connected to each said axle, said wheels being rotatably fixed to one another when said axles are rotatably coupled together, said wheels being free to rotate relative to one another when said axles are not rotatably coupled together.

9. The implement of claim 8, wherein said engine and said transaxle are directly and rigidly coupled together to form an engine and transaxle module.

10. The implement of claim 9, wherein said handle is connected to said engine and transaxle module.

11. The implement of claim 9, wherein said working device is one of a plurality of interchangeable working devices, said working device connected to said engine and transaxle module.

12. The implement of claim 8, wherein said implement is a snow thrower, and said working device is an auger assembly.

13. The implement of claim 8, wherein said transaxle comprises a collar having first and second positions, said collar engaging one of said axles in said first position, and said collar engaging both of said axles in said second position.

14. The implement of claim 13, wherein said collar is biased into one of its first and second positions.

15. The implement of claim 14, wherein said transaxle further comprises a spring disposed about said one of said axles and engaging said collar, said collar being biased into engagement with the other of said axles by said spring.

16. The implement of claim 8, wherein said transaxle further comprises reduction gearing, said reduction gearing including a pair of parallel shafts on which are disposed a plurality of gears, and said transaxle further comprises:
   a housing including first and second housing portions; and
   at least one bushing supported by said housing, said bushing including a pair of shaft retaining portions, one of said shaft retaining portions supporting one end of each said parallel shaft.

17. The implement of claim 16, wherein said bushing is elongate, and includes opposite ends each including a said shaft retaining portion.

* * * * *